US011260301B2

(12) United States Patent
Miyake et al.

(10) Patent No.: US 11,260,301 B2
(45) Date of Patent: Mar. 1, 2022

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Youichiro Miyake, Tokyo (JP); Makoto Hasegawa, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 17/006,034

(22) Filed: Aug. 28, 2020

(65) Prior Publication Data

US 2021/0060430 A1 Mar. 4, 2021

(30) Foreign Application Priority Data

Sep. 4, 2019 (JP) .............................. JP2019-161266

(51) Int. Cl.
*A63F 13/56* (2014.01)
*A63F 13/35* (2014.01)

(52) U.S. Cl.
CPC .............. *A63F 13/56* (2014.09); *A63F 13/35* (2014.09); *A63F 2300/6607* (2013.01)

(58) Field of Classification Search
CPC ... A63F 13/56; A63F 13/35; A63F 2300/6607
See application file for complete search history.

(56) References Cited

U.S. PATENT DOCUMENTS

| 5,899,810 A * | 5/1999 | Smith ................... A63F 13/358 463/42 |
| 8,182,267 B2 * | 5/2012 | Katz ........................ G09B 1/00 434/236 |
| 8,360,785 B2 * | 1/2013 | Park ...................... G06Q 10/10 434/247 |
| 9,844,725 B1 * | 12/2017 | Durkin ............... G06Q 30/0601 |
| 10,105,574 B2 * | 10/2018 | Rider ................. A63B 24/0075 |
| 10,434,417 B1 * | 10/2019 | Durkin .................. A63F 13/537 |
| 11,071,889 B2 * | 7/2021 | Case, Jr. ................ A63B 24/00 |
| 2007/0287596 A1 * | 12/2007 | Case, Jr. ............ A63B 24/0062 482/8 |

(Continued)

FOREIGN PATENT DOCUMENTS

JP  2012213485 A  11/2012

*Primary Examiner* — David L Lewis
*Assistant Examiner* — Matthew D Hoel
(74) *Attorney, Agent, or Firm* — Dorsey & Whitney LLP

(57) ABSTRACT

A non-transitory computer-readable medium including a video game processing program is provided. The video game processing program causes a server to: extract tasks from a domain including at least one compound task, methods being set to each of the at least one compound task; determine tasks to be executed from the tasks in addition to an execution order thereof, and generate the plan; control an action of the character on a basis of the plan; and exclude, when the task is a compound task to which methods are set in a situation that the character fails the task in a middle of the plan, a failed method from a selection target, and execute partial replanning to obtain a partial modification plan. The action of the character is controlled on a basis of the partial modification plan in a case where the partial modification plan is obtained.

6 Claims, 12 Drawing Sheets

(56) References Cited

U.S. PATENT DOCUMENTS

| | | | | |
|---|---|---|---|---|
| 2008/0032270 | A1* | 2/2008 | Katz | G09B 23/28 |
| | | | | 434/236 |
| 2010/0015586 | A1* | 1/2010 | Park | G06Q 10/10 |
| | | | | 434/247 |
| 2010/0222163 | A1* | 9/2010 | Eskildsen | A63B 63/00 |
| | | | | 473/570 |
| 2014/0285669 | A1* | 9/2014 | Lindner | H04N 5/247 |
| | | | | 348/157 |
| 2014/0330409 | A1* | 11/2014 | Case, Jr. | G01C 22/006 |
| | | | | 700/91 |
| 2015/0364026 | A1* | 12/2015 | Rubin | G06Q 10/063114 |
| | | | | 340/539.11 |
| 2016/0074707 | A1* | 3/2016 | Thorpe | G09B 19/0076 |
| | | | | 434/127 |
| 2016/0121163 | A1* | 5/2016 | Case, Jr. | A63B 24/0062 |
| | | | | 434/247 |
| 2016/0325144 | A1* | 11/2016 | Case, Jr. | G07F 17/323 |
| 2017/0061819 | A1* | 3/2017 | Addie-Gentle | A63F 3/0478 |
| 2017/0173394 | A1* | 6/2017 | Rider | A63B 24/0075 |
| 2017/0266500 | A1* | 9/2017 | Sanders | A43B 3/0005 |
| 2017/0266501 | A1* | 9/2017 | Sanders | A43B 5/00 |
| 2018/0193698 | A1* | 7/2018 | Case, Jr. | A63B 24/0021 |
| 2019/0299059 | A1* | 10/2019 | Case, Jr. | A63B 24/0062 |
| 2020/0238134 | A1* | 7/2020 | Case, Jr. | A63B 24/00 |
| 2021/0031081 | A1* | 2/2021 | Lewis | A63B 69/406 |
| 2021/0060430 | A1* | 3/2021 | Miyake | A63F 13/67 |
| 2021/0134170 | A1* | 5/2021 | Schultz | A63F 13/80 |

* cited by examiner

NON-TRANSITORY COMPUTER-READABLE MEDIUM AND VIDEO GAME PROCESSING SYSTEM

CROSS-REFERENCE TO RELATED APPLICATION(S)

The present application claims priority to Japanese Patent Application No. 2019-161266 filed on Sep. 4, 2019, the disclosure of which is expressly incorporated herein by reference in its entirety.

BACKGROUND OF THE INVENTION

1. Field of the Invention

At least one of embodiments of the present invention relates to a non-transitory computer-readable medium including a video game processing program and a video game processing system for causing a server to generate, on the basis of a hierarchical type task network, a plan for specifying tasks to be executed among a domain including a plurality of tasks, each of which is a candidate of an action that a character is caused to execute, in addition to an execution order, and perform a process to control an action of the character in a virtual space on the basis of the plan.

2. Description of the Related Art

Heretofore, various kinds of techniques for moving a character in a video game have been proposed.

In such techniques, there is one in which a moving route of a character is searched by using positional information regarding a virtual space that constitutes a video game, and this technique utilizes a navigation mesh and waypoints. In order to suppress a processing load required for a search of the moving route from being increased, there is one in which arrangement of route candidate locations in a search region is determined so that an interval between route candidate locations arranged outside a predetermined area is greater than an interval of route candidate locations arranged in the predetermined area of the search region. Examples of apparatuses, systems, and programs may be found in Japanese Published Patent Application No. JP2012-213485A.

SUMMARY

Here, as a method of executing a control of a character by automatically determining a task that a character other than an operation target of a user in a video game is caused to execute, a way of using a hierarchical type task network has been performed. The hierarchical type task network holds set of tasks that can be executed under a predetermined condition as a domain; grasps a situation of a World State at that point of time; and selects an optimal task in accordance with the situation of the World State. This makes it possible to determine a plan so that the tasks are executed in an appropriate execution order.

By using the hierarchical type task network, it becomes possible to plan an optimal action each time in accordance with changing environment such as a situation of a virtual space in which a character acts. Namely, a developer does not need to determine a connection relationship for relation among all tasks in advance unlike a tree structure when an AI for a character control is introduced. Therefore, there is a merit that a load on the developer is reduced. On the other hand, a process to create a plan by the hierarchical type task network is different from a process to execute a plan obtained by planning. For this reason, in a case where execution of a task in the middle of the plan is failed conventionally, replanning is executed from the beginning again. In this case, when a character to be controlled is objectively observed on the basis of the plan, there has been a fear that sudden start of execution of an action unrelated to the action that is intended to be executed but is failed appears, that is, execution of an unnatural action appears.

It is an object of at least one of embodiments of the present invention to provide a non-transitory computer-readable medium including a video game processing program and a video game processing apparatus capable of executing planning by a hierarchical type task network so that an action of a character as a control target looks like a natural action.

According to one non-limiting aspect of the present invention, there is provided a non-transitory computer-readable medium including a video game processing program for causing a server to perform processing to generate, on a basis of a hierarchical type task network, a plan for specifying tasks to be executed among a domain including a plurality of tasks in addition to an execution order of the tasks, and control an action of a character in a virtual space on a basis of the plan. Each of the plurality of tasks is a candidate of an action that a character is caused to execute.

The server is caused to perform an extracting function configured to extract a plurality of tasks from a domain including at least one compound task, a plurality of methods being set to each of the at least one compound task, the plurality of tasks becoming a target of planning.

The server is also caused to perform a planning function configured to determine tasks to be executed from the plurality of tasks thus extracted in addition to an execution order of the tasks, the planning function being configured to generate the plan.

The server is also caused to perform a controlling function configured to control an action of the character on a basis of the plan generated by planning.

The server is also caused to perform a partial planning function. configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan.

In this case, the controlling function is further configured to control the action of the character on a basis of the partial modification plan in a case where the partial modification plan is obtained.

According to another non-limiting aspect of the present invention, there is provided a video game processing system for causing a user terminal to perform processing to generate, on a basis of a hierarchical type task network, a plan for specifying tasks to be executed among a domain including a plurality of tasks in addition to an execution order of the tasks, and control an action of a character in a virtual space on a basis of the plan. Each of the plurality of tasks is a candidate of an action that a character is caused to execute. The video game processing system includes a communication network, a server, and a user terminal.

The video game processing system includes an extracting unit configured to extract a plurality of tasks from a domain including at least one compound task, a plurality of methods being set to each of the at least one compound task, the plurality of tasks becoming a target of planning.

The video game processing system also includes a planning unit configured to determine tasks to be executed from the plurality of tasks thus extracted in addition to an execution order of the tasks, the planning function being configured to generate the plan.

The video game processing system also includes a controlling unit configured to control an action of the character on a basis of the plan generated by planning.

The video game processing system also includes a partial planning unit configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan.

In this case, the controlling unit is further configured to control the action of the character on a basis of the partial modification plan in a case where the partial modification plan is obtained.

According to still another non-limiting aspect of the present invention, there is provided a non-transitory computer-readable medium including a video game processing program for causing a user terminal to perform processing to generate, on a basis of a hierarchical type task network, a plan for specifying tasks to be executed among a domain including a plurality of tasks in addition to an execution order of the tasks, and control an action of a character in a virtual space on a basis of the plan. Each of the plurality of tasks is a candidate of an action that a character is caused to execute.

The user terminal is caused to perform an extracting function configured to extract a plurality of tasks from a domain including at least one compound task, a plurality of methods being set to each of the at least one compound task, the plurality of tasks becoming a target of planning.

The user terminal is also caused to perform a planning function configured to determine tasks to be executed from the plurality of tasks thus extracted in addition to an execution order of the tasks, the planning function being configured to generate the plan.

The user terminal is also caused to perform a controlling function configured to control an action of the character on a basis of the plan generated by planning.

The user terminal is also caused to perform a partial planning function configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan.

In this case, the controlling function is further configured to control action the character on a basis of the partial modification plan in a case where the partial modification plan is obtained.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
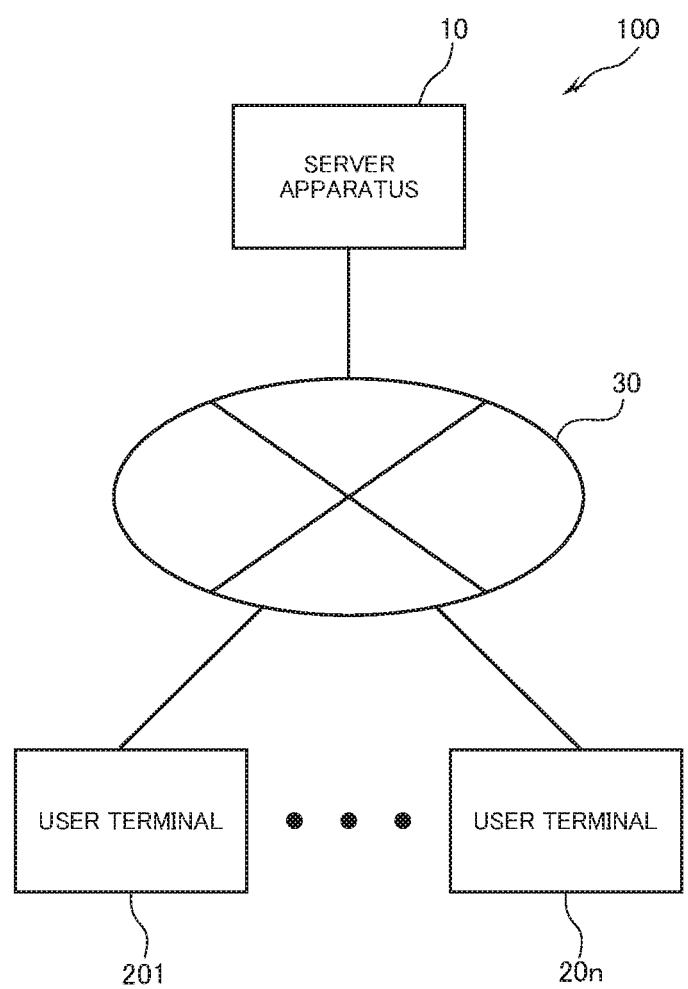
FIG. 1 is a block diagram illustrating an example of a configuration of a video game processing system corresponding to at least one of the embodiments of the present invention.

FIG. 1 is a block diagram illustrating an example of a configuration of a video game processing system 100 according to one embodiment of the present invention. As illustrated in FIG. 1, the video game processing system 100 includes a server apparatus 10 and user terminals 201 to 20*n*

("n" is an arbitrary integer, hereinafter, by representing them, simply referred to as a "user terminal 20") respectively used by users of the video game processing system 100. In this regard, the configuration of the video game processing system 100 is not limited to this configuration. The video game processing system 100 may be configured so that the plurality of users uses a single user terminal, or may be configured so as to include a plurality of server apparatuses.

Each of the server apparatus 10 and the plurality of user terminals 201 to 20n is connected to a communication network 30 such as the Internet. In this regard, although it is not illustrated in the drawings, the plurality of user terminals 201 to 20n is connected to the communication network 30 by executing data communication with base stations managed by a telecommunication carrier, for example, by means of a radio communication line.

The video game processing system 100 includes the server apparatus 10 and the plurality of user terminals 201 to 20n, whereby various kinds of functions for executing various kinds of processing in response to an operation of the user is performed.

The server apparatus 10 is managed by an administrator of the video game processing system 100, and has various kinds of functions to provide information regarding various kinds of processing to the plurality of user terminals 201 to 20n. In the present embodiment, the server apparatus 10 is constructed by an information processing apparatus, such as a WWW server, and includes a storage medium for storing various kinds of information. In this regard, the server apparatus 10 is provided with a general configuration for executing the various kinds of processing as a computer, such as a control section and a communicating section. However, its explanation herein is omitted. Further, in the video game processing system 100, it is preferable that the server apparatus 10 manages various kinds of information from a point of view to reduce a processing load on each of the plurality of user terminals 201 to 20n. However, a storing section for storing various kinds of information may include a storage region in a state that the server apparatus 10 can access the storage region. For example, the server apparatus 10 may be configured so as to be provided with a dedicated storage region outside the server apparatus 10.

The plurality of user terminals 201 to 20n is respectively managed by the users. Each of the plurality of user terminals 201 to 20n may be a communication terminal such as a cellular telephone terminal or a PDA (Personal Digital Assistants), for example. It is necessary that each of the plurality of user terminals 201 to 20n is configured so as to mount a camera device for photographing at least one of a moving image or a still image by the user and include a display for displaying photographed image data or the like. As other examples of the user terminal, there are a so-called wearable divide such as a smartwatch, and a combination of the wearable divide and the communication terminal. Further, the camera device may include an optical camera, or may be one that uses a three-dimensional camera device together. Further, each of the user terminals 201 to 20n includes inputting means for inputting drawing information, such as a mouse, a touch panel, or a touch pen.

Further, each of the plurality of user terminals 201 to 20n is connected to the communication network 30, and includes hardware and software for executing various kinds of processes by communicating with the server apparatus 10. In this regard, each of the plurality of user terminals 201 to 20n may be configured so as to be capable of directly communicating with each other without using the server apparatus 10.

In process of executing information processing, the server apparatus 10 appropriately transmits a process stage to each of the plurality of user terminals 201 to 20n. Each of the user terminals 201 to 20n causes a display device to display the screen content based on the content of the received process stage on a display screen of the display device. The server apparatus 10 may generate the screen content, or each of the plurality of user terminals 201 to 20n may generate the screen content.

Figure 2:
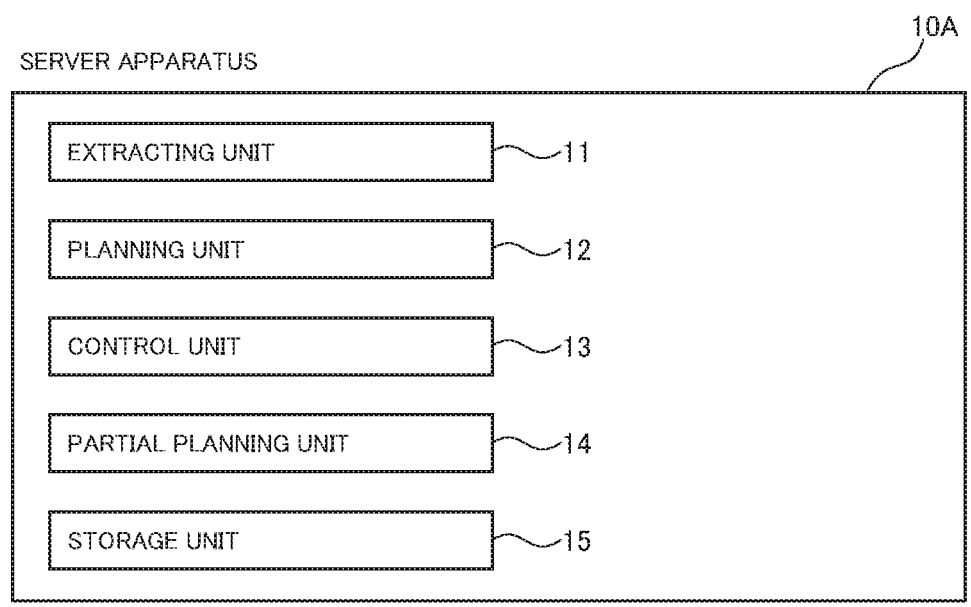
FIG. 2 is a block diagram illustrating a configuration of a server apparatus corresponding to at least one of the embodiments of the present invention.

FIG. 2 is a block diagram illustrating a configuration of a server apparatus corresponding to at least one of the embodiments of the present invention. As illustrated in FIG. 2, a server apparatus 10A at least includes an extracting unit 11, a planning unit 12, a control unit 13, a partial planning unit 14, and a storage unit 15.

The extracting unit 11 has a function to extract a plurality of tasks from a domain including at least one compound tasks each of which a plurality of methods is set. The plurality of tasks becomes a target of planning. As a premise, in a hierarchical type task network, a virtual space under a specific situation is called a world, a state of the world is called a World State, and set of tasks that can be selected under a specific situation is called a domain. The domain may contain a compound task and a primitive task. Here, the compound task means one of tasks, which is to be executed in the hierarchical type task network and has a plurality of methods in each of which a way of leading to a result that a task is to achieve is described. The method means a method that has a condition for the method being selected, and a list (to reference) of tasks when the method is selected. The method has the condition and the list for referring to any of the compound task and the primitive task. The primitive task means a task that includes an operator actually influencing an operation target. The primitive task has a condition for execution, an operator indicating the content to be executed, and an influence (or an effect) on the World State at the time of execution. The operator means a single action (or behavior) that carries out an actual process. This extracting unit 11 extracts the plurality of tasks, each of which becomes a planning target, from the domain suitable for the World State at the time of planning. Further, this extracting unit 11 may extract the whole domain.

The planning unit 12 has a function to determine tasks to be executed from the plurality of tasks thus extracted in addition to an execution order thereof, and generate a plan. Generation of the plan is executed by a planner (Planner). The planner means a function to make a list of tasks while executing simulation to appropriately refer to or edit the World State for the plurality of tasks included in the domain (that is, the plurality of tasks thus extracted). Of the tasks included in the domain, the most significant task in the domain, which is always considered first, is called a route task. In the planning unit 12, planning is started from the route task of the domain, and a plan is generated on the basis of the World State at that time.

The control unit 13 has a function to control an action of a character on the basis of the plan generated by planning. Here, the character means a target for which an action control is executed on the basis of the plan generated by the hierarchical type task network. For example, the character corresponds to a character that user cannot operate (for example, a non-player character). An influence on the World State at the time of generation of the plan is just one at a simulation stage. Therefore, in a case where a character in a video game is caused to actually execute the action based on the plan, it is not always possible for the character to execute all the tasks in accordance with the plan. The control unit 13 controls the actions of the character in an execution order of the plan in turn. In a case where all the tasks can be executed in accordance with the plan, the control unit 13 determines that the plan is normally terminated and terminates the plan. In a case where execution of any of the tasks in the plan is failed, the control unit 13 determines execution of which task is failed and stores its result.

Further, the control unit 13 has a function to control an action of the character on the basis of a partial modification plan in a case where the partial modification plan is obtained as a result of execution of partial planning by the partial planning unit 14 (will be described later).

The partial planning unit 14 has a function to exclude, in a case where a task is a compound task to which a plurality of methods is set in a situation that the character fails the task in the middle of the plan, a failed method from a selection target, and execute partial replanning by using the compound task as a starting point task to obtain a partial modification plan. In a case where the plurality of methods is included in the compound task, various kinds of conditions, such as a selection condition for the method based on a situation, or a designation condition for the method, which is preferentially selected in a case where a specific condition is not satisfied, are set. However, in a case where failure of the compound task is specified in this partial planning unit 14, the partial planning unit 14 records a fact that the failed method is to be excluded from the selection target regardless of the various kinds of conditions. The partial planning unit 14 then extracts the failed method from the selection target to set the compound task to the starting point task, and executes planning from the compound task. In the present embodiment, planning by using the failed compound task as the starting point task instead of the route task of the domain in this manner is called "partial planning".

The storage unit 15 has a function to store data necessary for various processes executed by the server apparatus 10A and data obtained as a result of each of the processes.

Figure 3:
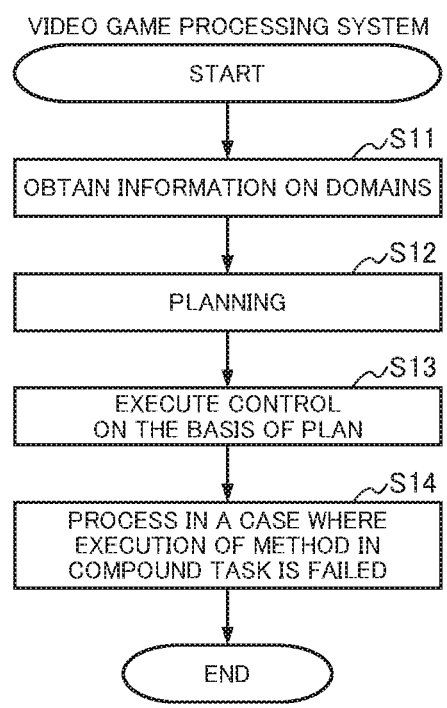
FIG. 3 is a flowchart illustrating an example of character control processing corresponding to at least one of the embodiments of the present invention.

Next, a flow of processing executed by the video game processing system 100 according to the present embodiment will be described. FIG. 3 is a flowchart illustrating an example of character control processing corresponding to at least one of the embodiments of the present invention. Hereinafter, a case where the character control processing is started when a control target is determined will be described as an example.

As illustrated in FIG. 3, the character control processing is fist started in a case where the video game processing system 100 obtains information on domains (that is, extracts a plurality of tasks that become targets of planning) (Step S11). Next, the video game processing system 100 executes planning to generate a plan (Step S12). Next, the video game processing system 100 executes a control of a character on the basis of the plan (Step S13). In a case where all of the tasks can be executed as the plan, the video game processing system 100 determines that the plan is normally terminated, and terminates the character control processing based on the plan. However, in a case where execution of a method in any compound task included in the plan is failed, the video game processing system 100 executes a process in a case where failing execution of the method in the compound task (Step S14).

In a case where execution of the method in the compound task is failed, the video game processing system 100 records a fact that the failed method is to be excluded from a selection target. Next, the video game processing system 100 extracts the failed method from the selection target to set the compound task to a starting point task, and executes partial planning. The video game processing system 100 then executes an action control for the character on the basis of a partial modification plan obtained by the partial planning.

Figure 4:
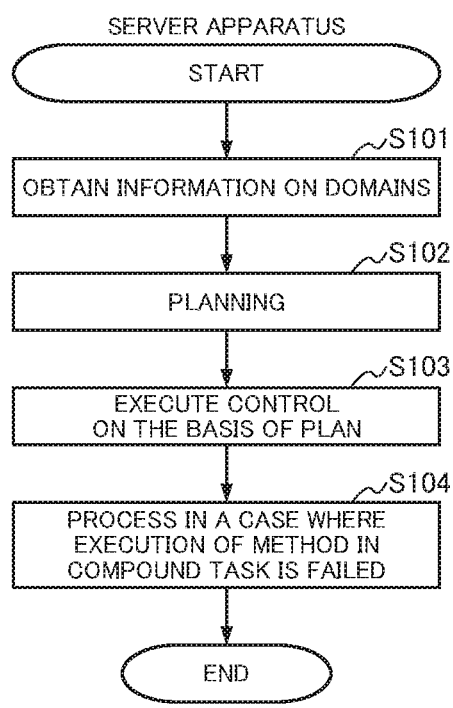
FIG. 4 is a flowchart illustrating an example of an operation of a server side in the character control processing corresponding to at least one of the embodiments of the present invention.

FIG. 4 is a flowchart illustrating an example of an operation of a server side in the character control processing corresponding to at least one of the embodiments of the present invention. Here, an operation of the server apparatus 10A in the video game processing system 100 will be described.

As illustrated in FIG. 4, the character control processing is first started in a case where the server apparatus 10A obtains information on domains (that is, extracts a plurality of tasks that become targets of planning) (Step S101). Next, the server apparatus 10A executes planning to generate a plan (Step S102). Next, the server apparatus 10A executes a control of a character on the basis of the plan (Step S103). In a case where all of the tasks can be executed as the plan, the server apparatus 10A determines that the plan is normally terminated, and terminates the character control processing based on the plan. However, in a case where execution of a method in any compound task included in the plan is failed, the video game processing system 100 executes a process in case of failing execution of the method in the compound task (Step S104). In a case where execution of the method in the compound task is failed, the server apparatus 10A records a fact that the failed method is to be excluded from a selection target. Next, the server apparatus 10A extracts the failed method from the selection target to set the compound task to a starting point task, and executes partial planning. The server apparatus 10A then executes an action control for the character on the basis of a partial modification plan obtained by the partial planning.

Figure 5:
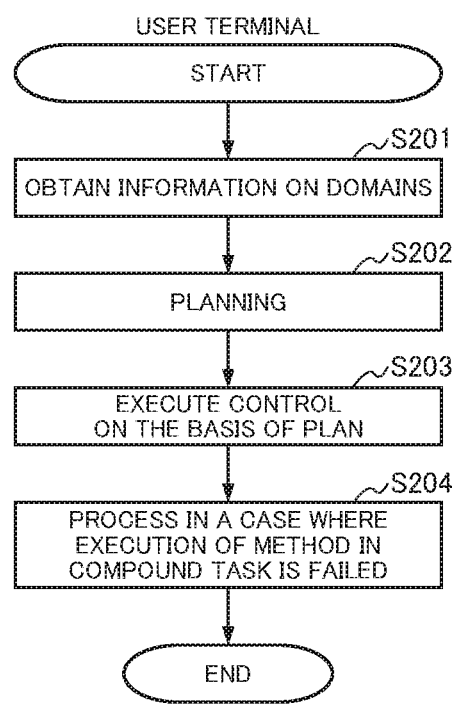
FIG. 5 is a flowchart illustrating an example of an operation of a terminal side in the character control processing corresponding to at least one of the embodiments of the present invention.

FIG. 5 is a flowchart illustrating an example of an operation of a terminal side in the character control processing corresponding to at least one of the embodiments of the present invention. In this regard, the user terminal 20 is configured so as to include the similar functions to the configuration of the server apparatus 10A except for reception of various kinds of information from the server apparatus 10A. For this reason, its description is omitted from a point of view to avoid repeated explanation.

As illustrated in FIG. 5, the character control processing is fist started in a case where the user terminal 20 obtains information on domains (that is, extracts a plurality of tasks that become targets of planning) (Step S201). Next, the user terminal 20 executes planning to generate a plan (Step S202), Next, the user terminal 20 executes a control of a character on the basis of the plan (Step S203). In a case where all of the tasks can be executed as the plan, the user terminal 20 determines that the plan is normally terminated, and terminates the character control processing based on the plan. However, in a case where execution of a method in any compound task included in the plan is failed, the user terminal 20 executes a process in a case where failing execution of the method in the compound task (Step S204). In a case where execution of the method in the compound task is failed, the user terminal 20 records a fact that the failed method is to be excluded from a selection target. Next, the user terminal 20 extracts the failed method from the selection target to set the compound task to a starting point task, and executes partial planning. The user terminal 20 then executes an action control for the character on the basis of a partial modification plan obtained by the partial planning.

As explained above, as one side of the first embodiment, the server apparatus 10A is configured so as to include the extracting unit 11, the planning unit 12, the control unit 13, and the partial planning unit 14. Thus, the extracting unit 11 extracts the plurality of tasks from the domain including at least one compound task, a plurality of methods being set to each of the at least one compound task, the plurality of tasks becoming a target of planning: the planning unit 12 determines tasks to be executed from the plurality of tasks thus extracted in addition to the execution order thereof, and generate the plan; the control unit 13 controls the action of the character on the basis of the plan generated by planning; and the partial planning unit 14 excludes, in a case where the task is the compound task to which the plurality of methods is set in a situation that the character fails the task in the middle of the plan, the failed method from the selection target, and executes the partial replanning by using the compound task as the starting point task to obtain a partial modification plan; and the control unit 13 controls the action of the character on the basis of the partial modification plan in a case where the partial modification plan is obtained. Therefore, it becomes possible to execute a character control so that the action of the character as the control target looks like a natural action.

Namely, in a case where the task is failed in the middle of the plan conventionally, replanning is executed from the beginning again. Therefore, when the character controlled on the basis of the plan is objectively observed, there has been a risk that it seems that the character suddenly starts to execute another action unrelated to the action that has been executed but failed. However, according to the present embodiment, even though one method is failed in the compound task, the character control is executed on the basis of the partial modification plan for executing the other methods. Therefore, the character is controlled so as to execute an action that is highly related to the failed action, and as a result, the character control is performed so that the action of the character looks like a natural action.

Second Embodiment

Figure 6:
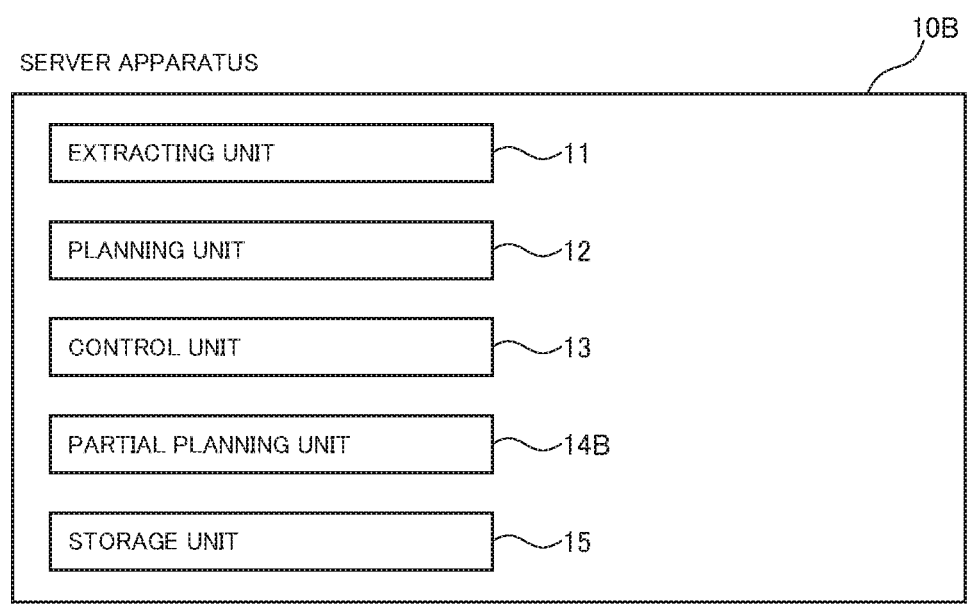
FIG. 6 is a block diagram illustrating a configuration of a server apparatus corresponding to at least one of the embodiments of the present invention.

FIG. 6 is a block diagram illustrating a configuration of a server apparatus corresponding to at least one of the embodiments of the present invention. As illustrated in FIG. 6, a server apparatus 10B at least includes an extracting unit 11, a planning unit 12, a control unit 13, a partial planning unit 14B, and a storage unit 15.

The partial planning unit 14B has a function to exclude, in a case where a task is a compound task to which a plurality of methods is set in a situation that a character fails the task in the middle of a plan, a failed method from a selection target, and executes partial replanning by using the compound task as a starting point task to obtain a partial modification plan. Further, the partial planning unit 14B has a function to execute, in a case where partial planning is failed in the compound task containing the method that is executed when the task is failed, partially replanning by using a compound task located before the compound task failed in the plan by a predetermined number of layers as the starting point task to obtain the partial modification plan. Here, the phrase "partial planning is failed in the compound task containing the method that is executed when the task is failed" means a case where the failed method is excluded from the selection target in the plan, and the compound task is set as the starting point task to execute the partial planning, but another method cannot be selected under a condition of a World State at that time, or a case where a character control is executed on the basis of the partial modification plan obtained in turn by executing the partial planning, but execution of all of the methods included in the compound task is failed. In the present embodiment, these situations are called a fact that the whole compound task is failed. Further, the phrase "a compound task located before the failed compound task by the predetermined number of layers" means a compound task located before the failed compound task by the predetermined number of layers that have been succeeded once when the character control is first executed on the basis of a plan generated in the planning unit 12. The predetermined number of layers may be set to any number. However, in order to prevent an action of a character as a control target from looking like an unnatural action, it is preferable to set a small number of layers rather than a large number of layers. In this regard, in a case where the compound task located before the failed compound task by the predetermined number of layers is set as the starting point task to execute the partial planning, it is possible to appropriately set whether the method that has been succeeded once when the character control is first executed on the basis of the plan is set to be outside the selection target or not. However, in order to take a route different from a route toward the compound task the whole of which is failed, it is preferable that a method first selected in the compound task located before the failed compound task by the predetermined number of layers is excluded from the selection target.

Figure 7:
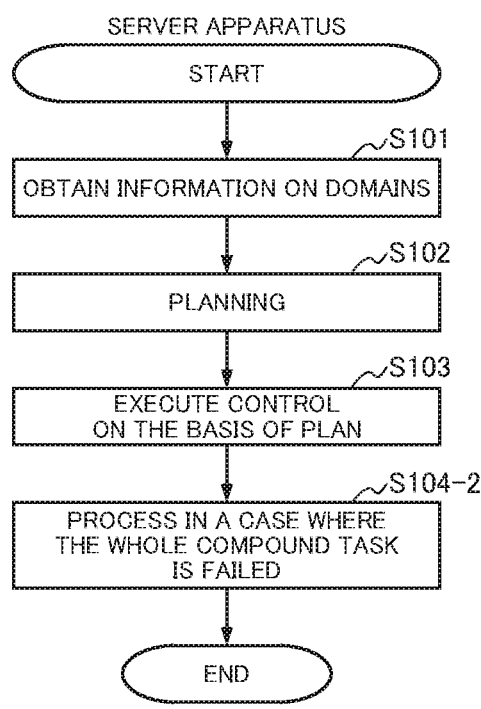
FIG. 7 is a flowchart illustrating an example of an operation of a server side in character control processing corresponding to at least one of the embodiments of the present invention.

FIG. 7 is a flowchart illustrating an example of an operation of a server side in character control processing corresponding to at least one of the embodiments of the present invention. Here, an operation of the server apparatus 10B in the video game processing system 100 will be described. Hereinafter, a case where character control processing is started by determining a control target will be described as an example.

As illustrated in FIG. 7, the character control processing is first started in a case where the server apparatus 10B obtains information on domains (that is, extracts a plurality of tasks that become targets of planning) (Step S101). Next, the server apparatus 10B executes planning to generate a plan (Step S102). Next, the server apparatus 10B executes a control of a character on the basis of the plan (Step S103). In a case where all of the tasks can be executed as the plan, the server apparatus 10B determines that the plan is normally terminated, and terminates the character control processing based on the plan. However, in a case where the whole of any compound task included in the plan is failed, the server apparatus 10B executes a process in a case where the whole compound task is failed (Step S104-2). In a case where the whole compound task is failed, the server apparatus 10B sets a compound task located before the failed compound task by a predetermined number of layers as a starting point task to execute partial planning. At that time, the server apparatus 10B may exclude a method that has been succeeded when the plan is first executed (that is, a method that shifts to the compound task the whole of which is failed) from the selection target to execute the partial planning. The server apparatus 10B then executes an action control for the character on the basis of a partial modification plan obtained by the partial planning.

As explained above, as one side of the second embodiment, the server apparatus 10B is configured so as to include the extracting unit 11, the planning unit 12, the control unit 13, and the partial planning unit 14B. Thus, the partial planning unit 14B executes, in a case where partial planning is failed in the compound task containing the method that is executed when the task is failed, the partially replanning by using the compound task located before the compound task failed in the plan by the predetermined number of layers as the starting point task to obtain the partial modification plan. Therefore, it becomes possible to execute a character control so that the action of the character as the control target looks like a natural action.

Namely, in a case where the whole compound task that has been failed at the time of the character control by a first plan is failed, compared with a case where the planning unit 12 generates the plan from the beginning again, by executing the character control on the basis of a partial modification plan that returns to a compound task located before the whole compound task thus failed by a few layers, it seems that the character returns to a previous situation and acts when the character is observed objectively. Therefore, as a result, it becomes possible to execute the character control so that the action of the character as the control target looks like the natural action.

Third Embodiment

Figure 8:
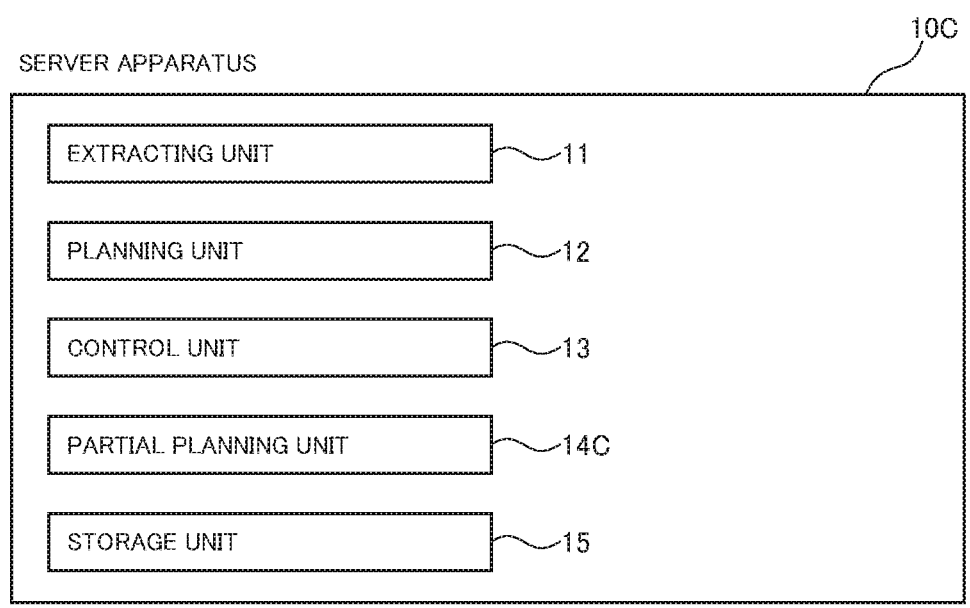
FIG. 8 is a block diagram illustrating a configuration of a server apparatus corresponding to at least one of the embodiments of the present invention.

FIG. 8 is a block diagram illustrating a configuration of a server apparatus corresponding to at least one of the embodiments of the present invention. As illustrated in FIG. 8, a server apparatus 10C at least includes an extracting unit 11, a planning unit 12, a control unit 13, a partial planning unit 14C, and a storage unit 15.

The partial planning unit 14C has a function to exclude, in a case where a task is a compound task to which a plurality of methods is set in a situation that a character fails the task in the middle of a plan, a failed method from a selection target, partial replanning by using the compound task as a starting point task to obtain a partial modification plan. Further, the partial planning unit 14C has a function to execute, in a case where partial planning is failed in the compound task including the method that was executed when the task was failed, partial replanning by using a compound task located before the compound task failed in the plan by a predetermined number of layers as the starting point task to obtain the partial modification plan. Moreover, the partial planning unit 14C has a function to execute, in a case where the partial modification plan using the compound task located before the compound task first failed by the predetermined number of layers as the starting point task is executed and then failed, the planning again from a route task of a domain on the basis of a planning function. The phrase "a case where the partial modification plan using the compound task located before the compound task first failed by the predetermined number of layers as the starting point task is executed and then failed" means that the whole compound task located before the compound task first failed by the predetermined number of layers is failed. In this regard, each of the number of moving layers when to return to layers from the compound task first failed and the predetermined number of layers by which it is determined to execute the planning again from the route task of the domain can be set, and the different number of layers may be set to them. For example, it can be thought that the number of layers to be moved when the whole compound task is failed is set to one, and the predetermined number of layers by which it is determined to execute the planning again from the route task of the domain is set to two.

Figure 9:
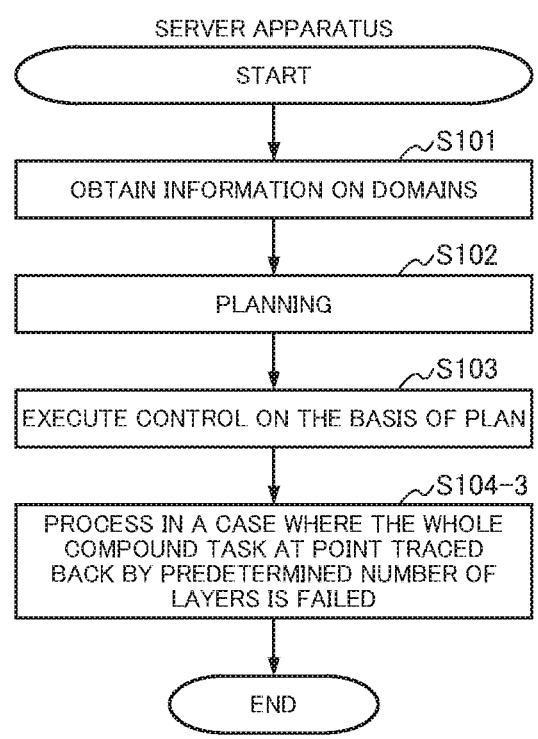
FIG. 9 is a flowchart illustrating an example of an operation of a server side in character control processing corresponding to at least one of the embodiments of the present invention.

FIG. 9 is a flowchart illustrating an example of an operation of a server side in character control processing corresponding to at least one of the embodiments of the present invention. Here, an operation of the server apparatus 1OC in the video game processing system 100 will be described. Hereinafter, a case where the character control processing is started when a control target is determined will be described as an example.

As illustrated in FIG. 9, the character control processing is first started in a case where the server apparatus 10C obtains information on domains (that is, extracts a plurality of tasks that become targets of planning) (Step S101). Next, the server apparatus 10C executes planning to generate a plan (Step S102). Next, the server apparatus 10C executes a control of a character on the basis of the plan (Step S103). In a case where all of the tasks can be executed as the plan, the server apparatus 10C determines that the plan is normally terminated, and terminates the character control processing based on the plan. However, in a case where the whole compound task at a point traced back by a predetermined number of layers on the basis of the compound task first failed is failed, the server apparatus 10C executes a process in a case where the whole compound task at the point traced back by the predetermined number of layers is failed (Step S104-3). In a case where the whole compound task at the point traced back by the predetermined number of layers is failed, the server apparatus 10C executes a process to execute the planning again from a route task of a domain. The server apparatus 10C then executes an action control for the character on the basis of the obtained plan.

As explained above, as one side of the third embodiment, the server apparatus 10C is configured to include the extracting unit 11, the planning unit 12, the control unit 13, and the partial planning unit 14C. Thus, the partial planning unit 14C executes, in a case where the partial modification plan using the compound task located before the compound task first failed by the predetermined number of layers as the starting point task is executed and then failed, the planning again from the route task of the domain on the basis of the planning function. Therefore, it becomes possible to execute a character control so that the action of the character as the control target looks like a natural action.

Namely, in a case where the whole compound task located before the compound task first failed by the predetermined number of layers is failed, it is possible to set a compound task located further before this compound task by a predetermined number of layers as a starting point task to execute the partial planning. However, the content is fax away from the content of the method that has been executed in the compound task first failed, and there is a high possibility that an action of the character will be inconsistent. Thus, in such a case, by executing the planning again from the route task of the domain, an action related to the action that is determined once is tried several times, but all of the actions are failed when observed objectively. Therefore, it becomes possible to control the action of the character so as to look like planning of another action again.

Fourth Embodiment

Figure 10:
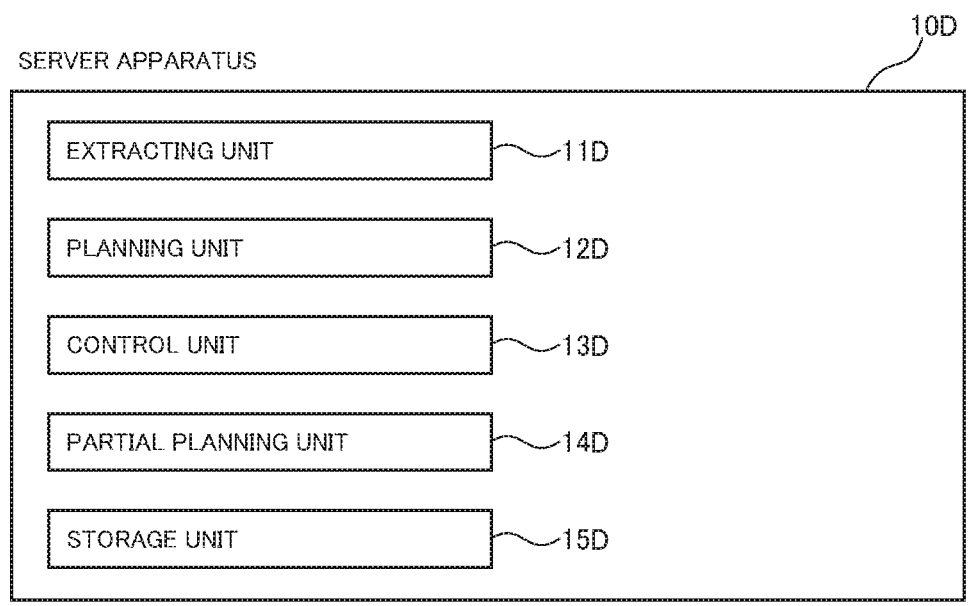
FIG. 10 is a block diagram illustrating a configuration of a server apparatus corresponding to at least one of the embodiments of the present invention.

FIG. 10 is a block diagram illustrating a configuration of a server apparatus 10D, which is an example of the server apparatus 10 in the video game processing system 100 (see FIG. 1). In the present embodiment, the server apparatus 10D at least includes an extracting unit 11D, a planning unit 12D, a control unit 13D, a partial planning unit 14D, and a storage unit 15D. In this regard, in the present embodiment, a case where the server apparatus 10D mainly executes processes will be described, but this is just one example. The video game processing system 100 may be configured so that a user terminal mainly executes the processes, or may be configured so that the processes are performed by executing a program on the user terminal under offline environment.

The extracting unit 11D has a function to extract a plurality of tasks from a domain including at least one compound tasks each of which a plurality of methods is set. The plurality of tasks becomes a target of planning.

The planning unit 12D has a function to determine tasks to be executed from the plurality of tasks thus extracted in addition to an execution order thereof, and generate a plan.

The control unit 13D has a function to control an action of a character on the basis of the plan generated by planning. Further, the control unit 13D has a function to control an action of the character on the basis of a partial modification plan in a case where the partial modification plan is obtained as a result of executing partial planning by the partial planning unit 14D (will be described later).

The partial planning unit 14D has a function to exclude, in a case where a task is a compound task to which a plurality of methods is set in a situation that the character fails the task in the middle of the plan, a failed method from a selection target, and execute partial replanning by using the compound task as a starting point task to obtain a partial modification plan. Further, the partial planning unit 14D has a function to execute, in a case where partial planning is failed in the compound task including the method that was executed when the task was failed, partial replanning by using a compound task located before the compound task failed in the plan by a predetermined number of layers as the starting point task to obtain the partial modification plan. Moreover, the partial planning unit 14D has a function to execute, in a case where the partial modification plan using the compound task located before the compound task first failed by the predetermined number of layers as the starting point task is executed and then failed, the planning again from a route task of a domain on the basis of a planning function.

The storage unit 15D has a function to store data necessary for various processes executed by the server apparatus 10D and data obtained as a result of each of the processes.

Figure 11:
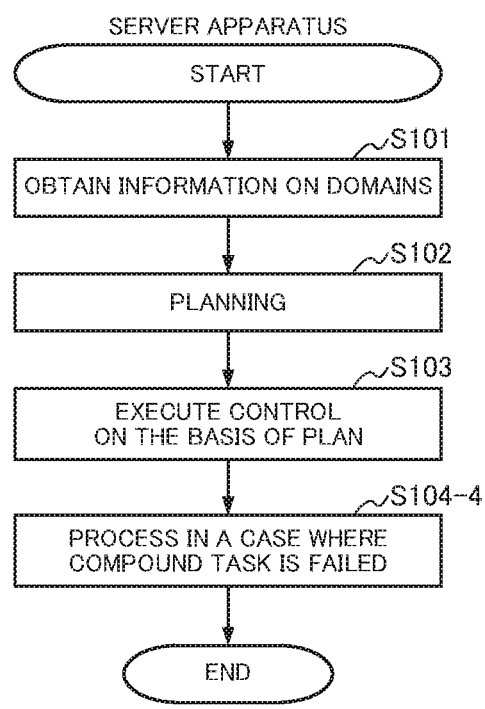
FIG. 11 is a flowchart illustrating an example of an operation of a server side in character control processing corresponding to at least one of the embodiments of the present invention.

FIG. 11 is a flowchart illustrating an example of an operation of a server side in character control processing corresponding to at least one of the embodiments of the present invention. Here, an operation of the server apparatus 10D in the video game processing system 100 will be described. Hereinafter, a case where the character control processing is started when a control target is determined will be described as an example.

As illustrated in FIG. 11, the character control processing is fist started in a case where the server apparatus 10D obtains information on domains (that is, extracts a plurality of tasks that become targets of planning) (Step S101). Next, the server apparatus 10D executes planning to generate a plan (Step S102). Next, the server apparatus 10D executes a control of a character on the basis of the plan (Step S103). In a case where all of the tasks can be executed as the plan, the server apparatus 10D determines that the plan is normally terminated, and terminates the character control processing based on the plan. However, in a case where execution of any of compound tasks included in the plan is failed, the server apparatus 10D executes a process when there is a failure in the compound task (Step S104-4). First, in a case where execution of a method in the compound task is failed, the server apparatus 10D records a fact that the failed method is excluded from a selection target (that is, stores a failure history). Next, the server apparatus 10D excludes the failed method from the selection target, and sets the compound task as a starting point task to execute partial planning. The server apparatus 10D then executes an action control for the character on the basis of a partial modification plan obtained by the partial planning.

In a case where a character control is executed on the basis of the partial modification plan but the whole compound task is failed, the server apparatus 10D sets the compound task located before the failed compound task by the predetermined number of layers as the starting point task, and executes the partial planning. At that time, the server apparatus 10D may exclude a method that has been succeeded when the plan is first executed (that is, a method that shifts to the compound task the whole of which is failed) from the selection target to execute the partial planning. The server apparatus 10D then executes an action control for the character on the basis of a partial modification plan obtained by the partial planning.

In a case where the whole compound task at a point traced back by the predetermined number of layers is failed, the server apparatus 10D executes a process for planning again from the route task of the domain (which is executed by the planning unit 12D). The server apparatus 10D then executes the action control of the character on the basis of the obtained plan.

A concrete example of the character control based on the configuration as described above will be described. As one example, in a video game in which a character (that is, a player character; hereinafter, referred to as a "PC") that is an operation target of a user acts with a character (that is, a non-player character; hereinafter, referred to as an "NPC") that is not an operation target of the user in a three-dimensional virtual space, it is assumed that an action of the NPC is planned on the basis of a hierarchical type task network (hereinafter, referred to also as an "HTN"). A mission of sniping an enemy character and a mission of searching the circumference to collect a treasure box and the like are given to the PC and the NPC, for example. The user operates the PC on the basis of the mission, but an action of the NPC is controlled on the basis of a plan determined by executing planning on the basis of the HTN.

Figure 12:
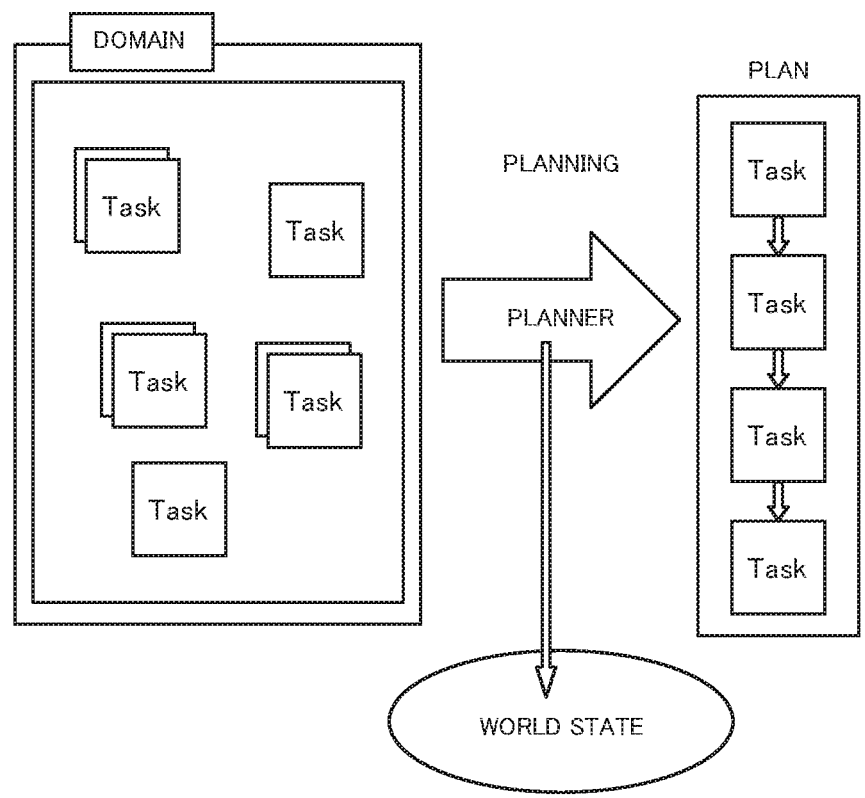
FIG. 12 is an explanatory drawing for explaining an outline of planning by a hierarchical type task network corresponding to at least one of the embodiments of the present invention.

FIG. 12 is an explanatory drawing for explaining an outline of the planning by the hierarchical type task network corresponding to at least one of the embodiments of the present invention. First, in the HTN, a situation of the virtual space in which the PC and the NPC act is defined as a World State, and a domain is registered and stored in advance as a set of tasks according to the environment given to the PC and the NPC. As illustrated in FIG. 12, the domain includes a plurality of tasks. Planning is executed on the basis of the domain, and the planning is executed by a planner. The planner refers to the World State appropriately, and executes the planning while simulating an influence on the World State after execution of the task. As a result of the planning, a plan that specifies an execution order of the plurality of tasks is generated.

In a process of generating the plan by the HTN, the server apparatus 10D first extracts a domain that is a set of tasks, which may be executed in a situation that the mission of sniping an enemy character and the mission of searching the circumference to collect a treasure box and the like are given. A route task that is the most significant task in the domain is set to the domain, and the planner then selects a task according to the situation of the World State appropriately. Further, a condition to select a task is associated with the planner. For example, a task to execute the mission of sniping an enemy character is selected preferentially, and condition setting is made so that the mission of searching the circumference to collect a treasure box and the like is executed in a situation that any enemy character does not exist.

As one example, four tasks exist that includes (1) a task of obtaining information on the World State, (2) a task of observing and grasping a surrounding environment on the spot, (3) a task of moving within a predetermined range to grasp the surrounding environment, and (4) a task of taking an action to open a door at an entrance of found building. Each of the tasks (2) to (4) is a compound task. For example, the task (2) has (2-1) a method of observing by the naked eyes, and (2-2) a method of observing by using binocular glasses. The task (3) has (3-1) a method of moving to a position of an obstacle by which something can be hidden and observing while hiding, and (3-2) a method of observing while walking within a predetermined range. The task (4) has (4-1) a method of opening a door by a possessed key (it is unknown whether the key is a correct key or not), (4-2) a method of opening a door by destroying the door, and (4-3) a method of opening a door by picking (only in case of having a picking technique). A method suitable for each situation is selected in each of these compound tasks (2) to (4). Further, the mission of sniping an enemy character is prioritized, thus in a case where an enemy character is found in any of the tasks (2) and (3), the process shifts to a compound task for making a preparatory action to snipe the enemy character.

As a result of executing a process of generating a plan by the HTN, a plan including a route for executing the tasks (1) to (4) in turn is generated. As a result of executing the action control for the NPC on the basis of this plan, the NPC does not find any enemy character on the way, arrives at the compound task (4) in which an action to open the door at the entrance of the found building, executes the selected method (4-1) in which the door is to be opened by the possessed key, but fails the method. Conventionally, in a case where a task is failed, the planning is executed again from the beginning. Thus, there has been a possibility that the NPC takes an unnatural action when observed objectively, such as execution of the task (3) a searching action of the surrounding environment again. However, in the present embodiment, in a case where the method (4-1) is failed, the method (4-1) is excluded from a selection target, and the compound task (4) is set as a starting point task to execute partial planning. By executing the partial planning, a partial modification plan to execute the method (4-2) or (4-3) is obtained. As a result of executing the action control for the NPC on the basis of the partial modification plan, if the door is successfully opened, it is determined that the whole plan is normally terminated. In a case where the method is also failed, the partial planning is executed so as to try all of the methods in the compound task (4).

In a case where all of the methods in the compound task (4) are failed, the planning is not executed again from the beginning, but the partial planning is executed by using the previous compound task by a predetermined number of layers, for example, the compound task (3) before one layer as the starting point task. At this time, the method that was executed at the time of shifting to the compound task (4) in the plan first generated of the plurality of methods in the compound task (3) may be excluded from the selection target. As a result of executing the partial modification plan starting from the compound task (3), in a case where a door different from the door first failed is found and this door is successfully opened, it is determined that the partial modification plan is normally terminated.

Here, the whole compound task (3) is failed in the partial modification plan starting from the compound task (3). As examples of a case where it is determined that the whole compound task is failed, there are a case where any searching result cannot be obtained, and a case where grounds of interruption occurs before the searching action is executed (for example, a case where an enemy character targets the NPC). In a case where the failure of this whole compound task (3) corresponds to a failure of the whole compound task located before the failed compound task by the predetermined number of layers, which is planned again from the beginning, then the process of planning again from the beginning is executed after returning to the compound task (1). Thus, by properly using either the process of setting the failed compound task as the starting point task to execute the partial planning when the compound task is failed or the process of planning again from the beginning when the whole compound task located before the failed compound task by the predetermined number of layers is failed, it becomes possible to execute a character control so that an action of the NPC as a control target looks like a natural action.

As explained above, as one side of the fourth embodiment 3, the server apparatus 10D is configured so as to include the extracting unit 11D, the planning unit 12D, the control unit 13D, and the partial planning unit 14D. Thus, the extracting unit 11D extracts the plurality of tasks from the domain including at least one compound tasks each of which the plurality of methods is set, the plurality of tasks becoming the target of planning; the planning unit 12D determine tasks to be executed from the plurality of tasks thus extracted in addition to the execution order thereof, and generate the plan; the control unit 13D controls the action of the character on the basis of the plan generated by planning; the partial planning unit 14D excludes, in a case where the task is the compound task to which the plurality of methods is set in a situation that the character fails the task in the middle of the plan, a failed method from the selection target, and executes partial replanning by using the compound task as the starting point task to obtain the partial modification plan; and the control unit 13D controls the action of the character on the basis of the partial modification plan in a case where the partial modification plan is obtained. Therefore, it becomes possible to execute a character control so that the action of the character as a control target looks like a natural action.

In this regard, in each of the first to fourth embodiments described above, the case where the partial modification plan is generated when the compound task is failed has been explained. However, the plan may be replaced by executing replanning in a situation that any compound task is not failed. For example, in a case where five tasks are to be executed in a plan first generated, a situation may occur in which a situation of a World State changes while the NPC is executing a second task and the tasks after a third task becomes non-optimal. In this case, in a case where a new plan is generated in accordance with the change in the situation of the World State and a portion where the task content is changed branches in a method higher than the task that the NPC is currently executing, all of the current plans are discarded, and they are replaced by the new plan. In a case where the portion where the task content is changed branches in a method lower than the task that the NPC is currently executing, the currently executing task is executed as it is, and only unexecuted task portion is replaced.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 201 to 20n and the server apparatus 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the video game processing system 100 may be configured so that the server apparatus 10 executes a part or all of the processes that have been explained as the processes executed by the user terminal 20. Alternatively, the video game processing system 100 may be configured so that any of the plurality of user terminals 201 to 20n executes a part or all of the processes that have been explained as the processes executed by the server apparatus 10. Further, the video game processing system 100 may be configured so that a part or all of the storage unit included in the server apparatus 10 is included in any of plurality of user terminals 201 to 20n. Namely, the video game processing system 100 may be configured so that a part or all of the functions of any one of the user terminal 20 and the server apparatus 10 according to the video game processing system 100 is included in the other.

Further, the video game processing system 100 may be configured so that the program causes a single apparatus to perform a part or all of the functions that have been explained as the example of each of the embodiments described above without including a communication network.

APPENDIX

The explanation of the embodiments described above has been described so that the following inventions can be at least performed by a person having a normal skill in the art to which the present invention belongs.

(1) A non-transitory computer-readable medium including a video game processing program for causing a server to perform processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the server being caused to perform:

an extracting function configured to extract a plurality of tasks from a domain including at least one compound task, a plurality of methods being set to each of the at least one compound task, the plurality of tasks becoming a target of planning;

a planning function configured to determine tasks to be executed from the plurality of tasks thus extracted in addition to an execution order of the tasks, the planning function being configured to generate the plan;

a controlling function configured to control an action of the character on a basis of the plan generated by planning; and a partial planning function configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling function is further configured to control the action of the character on a basis of the partial modification plan in a case where the partial modification plan is obtained.

(2) The on-transitory computer-readable medium according to (1), wherein the partial planning function is configured to execute, in a case where partial planning is failed in the compound task including the method that is executed at a time of failure, partial replanning by using a compound task located before the compound task failed in the plan by a predetermined number of layers as a starting point task to obtain the partial modification plan.

(3) The on-transitory computer-readable medium according to (2), wherein the partial planning function is configured to execute, in a case where the partial modification plan using the compound task located before the compound task first failed by the predetermined number of layers as the starting point task is executed and then failed, the planning again from a route task of the domain on the basis of the planning function.

(4) The on-transitory computer-readable medium according to any one of (1) to (3), wherein the partial planning function is configured to hold a history when the character fails to execute a task, and continue to hold the history until the partial modification plan is normally terminated without failure.

(5) A non-transitory computer-readable medium including a video game processing program for causing a user terminal to perform at least one function of the functions that the video game processing program described in any one of (1) to (4) causes the server to perform, the user terminal being capable of communicating with the server.

(6) A server into which the video game processing program described in any of (1) to (5) is installed.

(7) A video game processing system for causing a user terminal to perform processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the video game processing system including a communication network, a server, and a user terminal, the video game processing system comprising:

an extracting unit configured to extract a plurality of tasks from a domain including at least one compound task, a plurality of methods being set to each of the at least one compound task, the plurality of tasks becoming a target of planning;

a planning unit configured to determine tasks to be executed from the plurality of tasks thus extracted in addition to an execution order of the tasks, the planning function being configured to generate the plan;

a controlling unit configured to control an action of the character on a basis of the plan generated by planning; and a partial planning unit configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling unit is further configured to control the action of the character on a basis of the partial modification plan in a case where the partial modification plan is obtained.

(8) The video game processing system according to (7), wherein the server includes the extracting unit, the planning unit, the controlling unit, and the partial planning unit, and wherein the user terminal includes an outputting unit configured to output a game screen to a display screen of a display device, the character controlled by the controlling unit being displayed on the game screen.

(9) A non-transitory computer-readable medium including a video game processing program for causing a user terminal to perform terminal processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the user terminal being caused to perform:

a function configured to receive, from a server, information regarding server processing included in the server, the server processing containing a plurality of server functions; and a function configured to execute an input or an output corresponding to each of the server functions, wherein the server comprises the server processing including:

an extracting function configured to extract a plurality of tasks from a domain including at least one compound task, a plurality of methods being set to each of the at least one compound task, the plurality of tasks becoming a target of planning;

a planning function configured to determine tasks to be executed from the plurality of tasks thus extracted in addition to an execution order of the tasks, the planning function being configured to generate the plan;

a controlling function configured to control an action of the character on a basis of the plan generated by planning; and a partial planning function configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling function is further configured to control the action of the character on a basis of the partial modification plan in a case where the partial modification plan is obtained.

(10) A non-transitory computer-readable medium including a video game processing program for causing a user terminal to perform processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the user terminal being caused to perform:

an extracting function configured to extract a plurality of tasks from a domain including at least one compound task, a plurality of methods being set to each of the at least one compound task, the plurality of tasks becoming a target of planning;

a planning function configured to determine tasks to be executed from the plurality of tasks thus extracted in addition to an execution order of the tasks, the planning function being configured to generate the plan;

a controlling function configured to control an action of the character on a basis of the plan generated by planning; and a partial planning function configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling function is further configured to control the action of the character on a basis of the partial modification plan in a case where the partial modification plan is obtained.

(11) A non-transitory computer-readable medium including a video game processing program for causing a server to perform at least one function of the functions that the video game processing program described in (10) causes the user terminal to perform, the server being capable of communicating with the user terminal.

(12) A user terminal into which the video game processing program according to (10) or (11) is installed.

(13) A video game processing method of executing processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the video game processing method comprising:

an extracting process configured to extract a plurality of tasks from a domain including at least one compound task, a plurality of methods being set to each of the at least one compound task, the plurality of tasks becoming a target of planning;

a planning process configured to determine tasks to be executed from the plurality of tasks thus extracted in addition to an execution order of the tasks, the planning function being configured to generate the plan;

a controlling process configured to control an action of the character on a basis of the plan generated by planning; and a partial planning process configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling process is further configured to control the action of the character on a basis of the partial modification plan in a case where the partial modification plan is obtained.

(14) A video game processing method of executing, by a video game processing system, processing to generate, on a basis of a hierarchical type task network, a plan for specifying tasks to be executed among a domain including a plurality of tasks in addition to an execution order of the tasks, and control an action of a character in a virtual space on a basis of the plan, each of the plurality of tasks being a candidate of an action that a character is caused to execute, the video game processing system including a communication network, a server, and a user terminal, the video game processing method comprising:

an extracting process configured to extract a plurality of tasks from a domain including at least one compound task, a plurality of methods being set to each of the at least one compound task, the plurality of tasks becoming a target of planning;

a planning process configured to determine tasks to be executed from the plurality of tasks thus extracted in addition to an execution order of the tasks, the planning function being configured to generate the plan;

a controlling process configured to control an action of the character on a basis of the plan generated by planning; and a partial planning process configured to exclude, in a case where the task is a compound task to which a plurality of methods is set in a situation that the character fails the task in a middle of the plan, a failed method from a selection target, and execute partial replanning by using the compound task as a starting point task to obtain a partial modification plan, wherein the controlling process is further configured to control the action of the character on a basis of the partial modification plan in a case where the partial modification plan is obtained.

What is claimed is:

1. A non-transitory computer-readable medium including a video game processing program for causing a server to:
    generate, on a basis of a hierarchical type task network, a plan for specifying tasks to be executed among a domain including a plurality of tasks in addition to an execution order of the tasks;
    control an action of a character in a virtual space on a basis of the plan, each task of the plurality of tasks being a candidate of an action that a character is caused to execute; and
    perform functions including:
    an extracting function configured to extract a plurality of tasks from a domain including at least one compound task, a plurality of methods being set to each task of the at least one compound task, the plurality of tasks becoming a target of planning;
    a planning function configured to determine tasks to be executed from the plurality of tasks thus extracted in addition to an execution order of the tasks, the planning function being configured to generate the plan;
    a controlling function configured to control an action of the character on a basis of the plan generated by planning; and
    a partial planning function configured to exclude, if the task is a compound task to which a plurality of methods is set in a situation that the character fails the task in a middle of the plan, a failed method from a selection target, and further configured to execute partial replanning by using the compound task as a starting point task to obtain a partial modification plan,
    wherein the controlling function is further configured to control the action of the character on a basis of the partial modification plan if the partial modification plan is obtained.

2. The non-transitory computer-readable medium according to claim 1,
    wherein the partial planning function is configured to execute, if partial planning is failed in the compound task including the method that is executed at a time of failure, partial replanning by using a compound task located before the compound task failed in the plan by a predetermined number of layers as a starting point task to obtain the partial modification plan.

3. The non-transitory computer-readable medium according to claim 2,
    wherein the partial planning function is configured to execute, if the partial modification plan using the compound task located before the compound task first failed by the predetermined number of layers as the starting point task is executed and then failed, the planning from a route task of the domain on the basis of the planning function.

4. The non-transitory computer-readable medium according to claim 1,
    wherein the partial planning function is configured to store a history when the character fails to execute a task until the partial modification plan is normally terminated without failure.

5. A video game processing system comprising:
    a communication network:
    a server; and
    a user terminal configured to perform processing to generate, on a basis of a hierarchical type task network, a plan for specifying tasks to be executed among a domain including a plurality of tasks in addition to an execution order of the tasks, and further configured to control an action of a character in a virtual space on a basis of the plan, each task of the plurality of tasks being a candidate of an action that a character is caused to execute,
    wherein the video game processing system comprising:
    an extracting unit configured to extract a plurality of tasks from a domain including at least one compound task, a plurality of methods being set to each task of the at least one compound task, the plurality of tasks becoming a target of planning;
    a planning unit configured to determine tasks to be executed from the plurality of tasks thus extracted in addition to an execution order of the tasks, the planning function being configured to generate the plan;
    a controlling unit configured to control an action of the character on a basis of the plan generated by planning; and
    a partial planning unit configured to exclude, if the task is a compound task to which a plurality of methods is set in a situation that the character fails the task in a middle of the plan, a failed method from a selection target, and further configured to execute partial replanning by using the compound task as a starting point task to obtain a partial modification plan,
    wherein the controlling unit is further configured to control the action of the character on a basis of the partial modification plan if the partial modification plan is obtained.

6. A non-transitory computer-readable medium including a video game processing program for causing a user terminal to:
    generate, on a basis of a hierarchical type task network, a plan for specifying tasks to be executed among a domain including a plurality of tasks in addition to an execution order of the tasks;

control an action of a character in a virtual space on a basis of the plan, each task of the plurality of tasks being a candidate of an action that a character is caused to execute; and perform functions including:

an extracting function configured to extract a plurality of tasks from a domain including at least one compound task, a plurality of methods being set to each task of the at least one compound task, the plurality of tasks becoming a target of planning;

a planning function configured to determine tasks to be executed from the plurality of tasks thus extracted in addition to an execution order of the tasks, the planning function being configured to generate the plan;

a controlling function configured to control an action of the character on a basis of the plan generated by planning; and a partial planning function configured to exclude, if the task is a compound task to which a plurality of methods is set in a situation that the character fails the task in a middle of the plan, a failed method from a selection target, and further configured to execute partial replanning by using the compound task as a starting point task to obtain a partial modification plan, wherein the controlling function is further configured to control the action of the character on a basis of the partial modification plan in a case where the partial modification plan is obtained.

* * * * *